United States Patent [19]

Morissette

[11] 4,257,729
[45] Mar. 24, 1981

[54] HAND TRUCK

[76] Inventor: Gilles Morissette, 7950 Avenue Jacques-Rousseau, Apt. 403, Rivière-des-Prairies, Quebec, Canada, H1E 1J6

[21] Appl. No.: 43,656

[22] Filed: May 30, 1979

[30] Foreign Application Priority Data

May 6, 1977 [CA] Canada ................................ 277877

[51] Int. Cl.³ ................................................ B62B 1/06
[52] U.S. Cl. .................................. 414/490; 414/454; 414/622
[58] Field of Search ............... 414/490, 454, 622, 448, 414/465, 659, 471, 456; 187/9 R

[56] References Cited

U.S. PATENT DOCUMENTS

| | | | |
|---|---|---|---|
| 1,615,919 | 2/1927 | Sheldon | 414/454 |
| 2,447,300 | 8/1948 | Williams | 414/622 |
| 2,635,775 | 4/1953 | Ernst | 414/622 |
| 2,814,403 | 11/1957 | Ericson | 414/622 |
| 3,225,868 | 12/1965 | Barnes | 187/9 R |

FOREIGN PATENT DOCUMENTS

561136  4/1957  Italy .......................................... 414/456

*Primary Examiner*—James B. Marbert

[57] ABSTRACT

A hand truck for transporting loads which obviates the necessity of tilting the load prior to positioning the latter on the hand truck. The hand truck is devoid of any bottom plate and carries a pair of jaws clampable on the top flange, or bead, of a load and which suspends the load along the inclined truck frame when the truck frame is moved about on its wheels. The hand truck is further characterized by the provision of a foot-operated jack mechanism to raise the clamped load along the truck frame, so that the load may be deposited at any desired elevation when its destination is reached. The jaws are so arranged that they automatically increase the clamping pressure clamp on the load bead, or top flange, when the load exerts a downward pull on said jaws. The hand truck has, in addition to the usual pair of wheels, a pair of feet on which the hand truck is supported when in upright position with the wheels off the ground, ready to grab the load; these feet come off the ground when the wheels come in contact with the same to move the load about. The jacking mechanism can raise the load to such a position that its center of gravity will fall between the feet and wheels, so that the hand truck, with its load, can be left unattended, since it is stable with both feet and wheels supported on the ground.

2 Claims, 16 Drawing Figures

HAND TRUCK

The present invention relates to a hand truck and, more particularly, to a hand truck for the transportation of heavy objects, such as 45-gallon oil drums and the like containers having a top bead or flange.

The major disadvantage of known hand trucks of the character described lies in the fact that the drum has first to be tilted, so that the usual bottom plate of the hand truck can be inserted under the drum bottom. Then the drum and hand truck have to be tilted again in opposite direction to load the drum onto the hand truck for its transportation. This entails hard work, considering that barrels filled with liquid may weigh up to 500 pounds.

Another disadvantage of existing hand trucks lies in the fact that the load cannot, without considerable difficulty, be discharged from the truck onto a surface having a higher elevation than the surface supporting the wheels of the hand truck.

The general object of the invention resides in the provision of a hand truck which obviates the first above-noted disadvantage in that clamping means are mounted on the hand truck at a level to clamp a top bead, or top flange, of a free standing load, whereby the load becomes suspended from said clamp upon tilting of the hand truck in a position to be transported about by the hand truck.

Another object of the invention resides in the provision of a hand truck of the character described, in which the clamping means automatically increase their clamping pressure as soon as the load starts to exert a downward pull on the clamp.

Another object of the invention resides in the provision of a hand truck of the character described incorporating a jacking mechanism for raising the load along the hand truck frame, so as to be capable of depositing the load back onto a raised surface with respect to the wheel supporting surface.

Another object of the invention resides in the provision of a hand truck of the character described, which, when properly loaded, can be left standing up unattended, since it is stable on a supporting surface.

Another object of the invention resides in the provision of a hand truck of the character described, with which loading and unloading of the load can be very quickly effected while requiring a minimum effort.

Another object of the invention is the provision of a hand truck of the character described, wherein the hand truck handle is used as a means to tilt the load onto the truck during the loading operation.

The foregoing and other objects of the invention will become more apparent during the following disclosure and by referring to the drawings, in which.

In the drawings, like reference characters indicate like elements throughout.

The hand truck in accordance with the first embodiment, shown in FIGS. 1 to 5 inclusive, comprises a frame or support 1 provided at its lower end with a pair of ground-engaging wheels 2 and ground-engaging feet 3, while the upper end of the support forms a handle 4. A clamp 5, consisting of jaws 6 and 7, is carried by the support 1 and is adapted to clamp therebetween the top bead A of a drum B, or similar container or load, provided with a top bead or flange.

Preferably, the first embodiment further includes a jacking mechanism, generally indicated at 8, which, upon operation, raises the clamp 5 along the support 1 to raise the load therewith.

More specifically, the support 1 is of tubular construction and includes a pair of parallel straight front legs 9 and a pair of rear reinforcing legs 10 secured to the front legs at the top and bottom ends thereof and the front legs being further reinforced by transverse tubular braces 11 connecting and extending between the front and rear legs 9 and 10.

Front legs 9 form rearwardly and upwardly inclined top extensions 12 joined together to form handle 4. A curved drum supporting saddle 13, conforming, for instance, to the curvature of a standard 45-gallon oil drum, extends across and is secured to the front legs 9 a little above the lower ends thereof.

The feet 3 simply protrude from the lower ends of the front legs 9; they may consist of bolts adjustably screwed within the front legs 9. The two wheels 2 are rotatably mounted at the ends of a transverse shaft 15 secured to the support 1 by means of brace 14.

Figure 2:
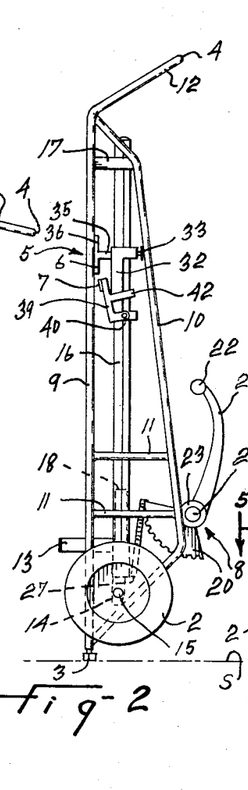
FIG. 2 is a side elevation of the same hand truck in upright position ready to clamp or unclamp a load.

The shaft 15 is located rearwardly of the front legs 9 and upwardly from the feet 3, such that in the tilted carrying position of the support 1, the feet 3 are raised off the supporting surface S, while in the upright position of the support 1, as shown in FIG. 2, the feet rest on the ground while the wheels are raised off surface S.

Figure 1:
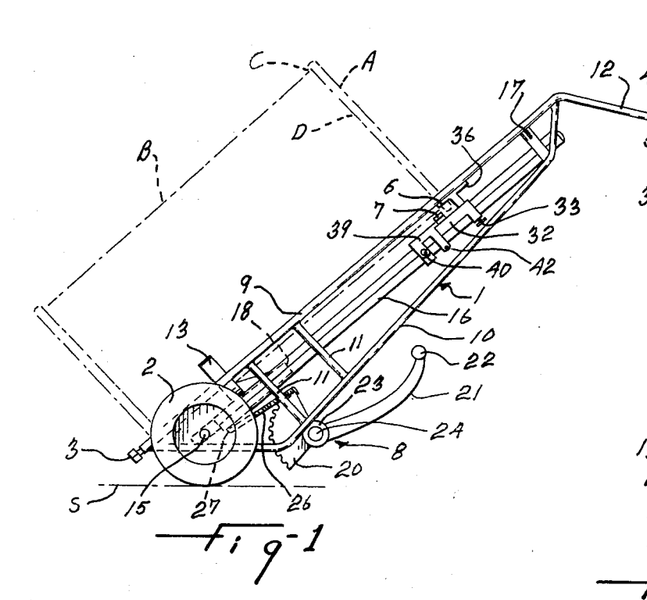
FIG. 1 is a side elevation of a first embodiment of a hand truck in accordance with the invention, shown in tilted transporting position with a load thereon.
Figure 3:
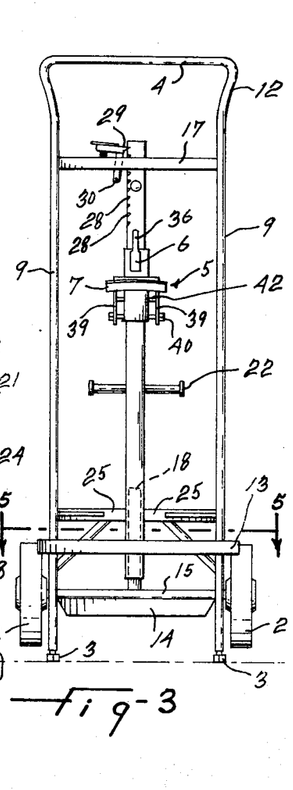
FIG. 3 is a front elevation of the hand truck in upright position.

An upwardly extending elongated member, in the form of a tubular member 16, extends parallel to the legs 9 rearwardly of the same, being mounted for longitudinal movement within a guiding hole in a top transverse brace member 17 secured to legs 9 and 10. The lower end of the tubular member 16 is guided in its longitudinal movement, because it slides over a post 18 secured to the support through the intermediary of shaft 15 and brace 14.

The jacking mechanism 8 serves to raise and lower the tubular member 16. The jacking mechanism includes a toothed sector 20 integral with an oppositely extending lever 21, having at its outer end a foot-operated pedal 22. The lever 21 and sector 22 form at their junction a sleeve 23 rotatable about a transverse shaft 24 secured to the rear legs 10 of the support by means of a bracing member 25. The sector 20 is disposed behind the tubular member 16; it carries at its upper edge a roller chain 26 adapted to mesh with the teeth of the sector 20; the lower end of the chain 26 is secured to the lower end of the tubular member 16 at 27.

Downward pivoting of the pedal 22 causes clockwise rotation of the sector and raising of the tubular member 16 along the guiding post 18 and through the top transverse member 17. The upper portion of the tubular member 16 is provided with V-shaped ratchet teeth 28 engageable by a spring-loaded pawl 29 to retain tubular member 16 in raised position as adjusted by the stroke imparted to the pedal 22. The pawl 29 is pivoted at 30 to the top transverse member 17, and upon a downward push exerted on push plate 31 of the pawl, the latter will release the rack member.

Figures 4, 5, 8:
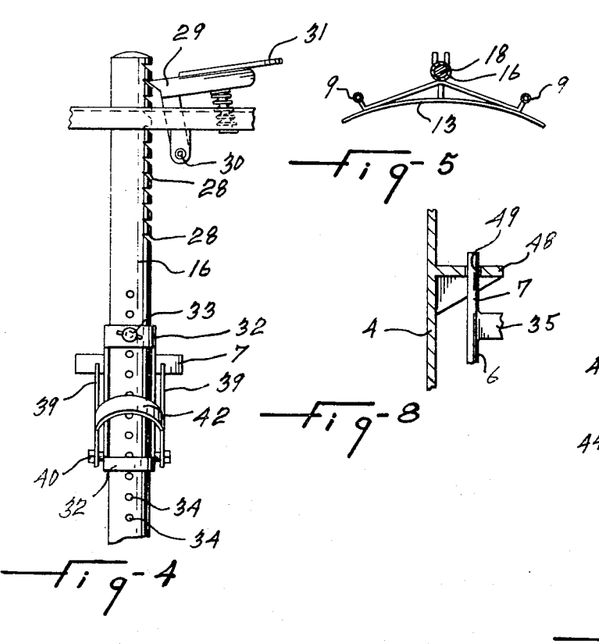
FIG. 4 is a partial elevation of the central rack member showing the clamping mechanism of the same.
FIG. 5 is a plan section, taken along line 5—5 of FIG. 3.
FIG. 8 is a partial section taken along line 8—8 of FIG. 7 and showing the means for hooking the accessory to the hand truck.

The clamp 5 includes a collar 32 surrounding the tubular member 16 and provided at the back with a spring-loaded pin 33 biased to cause engagement of the pin with anyone of a series of holes 34 made in the tubular member 16 and disposed in a longitudinal row along the latter. The pin 33 has the head which can be pulled against the bias of the spring to allow sliding of the collar along member 16 and engage another one of the holes 34 to thus adjustably vary the level of the collar member 4 of the clamp.

A member 35 is rigidly secured to and extends forwardly of the top of collar 32 and carries at its front end the first jaw 6 which is in the form of a downwardly extending finger extending centrally between the front legs 9 and just behind the plane containing said front legs.

The member 35 is provided with an upwardly extending finger 36 used as a hook for a purpose to be described later on.

The second jaw 7 of the clamp 5 consists of a curved transverse strip secured to the upper ends of a pair of lever arms 39 pivoted at their lower ends about a transverse axis 40 to the lower end of collar 32.

It will be noted that the pivot axis 40 is located rearwardly of the drum-engaging jaw 7 and downwardly therefrom. Pivotal movement of the lever arms 39 is limited, because the jaw 7 abuts against the front face of collar 32 and because the lever arms are secured to a yoke 42 surrounding the member 16 and abutting the back face of the same in the forwardly pivoted limit position of the lever arms 39. The jaw 7 is located just rearwardly of, and slightly below, the top fixed jaw 6 and can conform to the cylindrical outer surface of the drum B and engage under the downwardly facing step C formed by the conventional bead A of drum B, while the top jaw 35 engages the inside concave surface of the bead A till it abuts the top cover D of the drum.

It will be understood that with the drum bead so engaged between the jaws 6 and 7, any downward pull exerted by the drum of the jaws will cause the lower pivotal jaw 7 to further pivot counterclockwise and increase its clamping pressure on the outside surface of the drum. This is due to the rearwardly and downwardly inclined location of the pivot axis 40 with respect to the jaw 7.

Loading of a drum onto the hand truck is a simple operation. With the drum B standing up, the hand truck is brought alongside the drum and the support 1 is caused to take an upright position, using handle 12 with the feet 3 adjacent the base of the drum and with the front legs 9 centered with respect to the drum. Previous to this, the pedal 22 had been slightly depressed to raise the tubular member 16 and, consequently, the clamp 5 sufficiently so that the lower end of the jaw 6 would clear the top bead A of the drum in standing position. Once the jaw 6 is brought inside the bead A, the jacking mechanism 8 is again slightly operated to release the friction on the pawl 29, which can then be depressed to clear the ratchet teeth 28 of member 16, which then drops until the top jaw 6 touches the drum cover. In this position, the lower pivoted jaw 7 clears the lower edge of the bead A and engages under step C of said bead.

The pedal 22 is then fully depressed to raise the drum along the upright support 1. The pedal is released and the pawl 29 retains the drum in raised position. The support 1 is then rearwardly tilted into the transport position, shown in FIG. 1, with the feet 3 raised off the ground, so that the hand truck can roll on the wheels 2. When the unloading destination is reached, while the hand truck is still in tilted transport position, as shown in FIG. 1, the pedal 22 is again slightly depressed to release the pawl 29, which is then manually depressed and kept depressed to allow downward movement of the tubular member 16 until the bottom bead of the drum touches the supporting surface S. This releases the lower pivoted clamp 38 which can thus pivot rearwardly under gravity to clear the top bead A. The pedal is again slightly depressed to raise the clamp 5 above the top bead A and then the handle 4 is used to bring the hand truck in upright position. Thus, the hand truck causes the drum to take its upright position on surface S.

It will be noted that the supporting surface for the drum can be at a different level than the supporting surface for the hand truck wheels during loading or unloading.

A coil spring, not shown, is arranged to cause pivoting movement of the lever 21 to its raised position to be out of the way during transport of the load.

During transport, the drum B is positively centered with respect to the front legs of the hand truck by means of the transverse saddle 13 on which the outer surface of the drum rests much below its top clamped bead A.

Figures 6, 7:
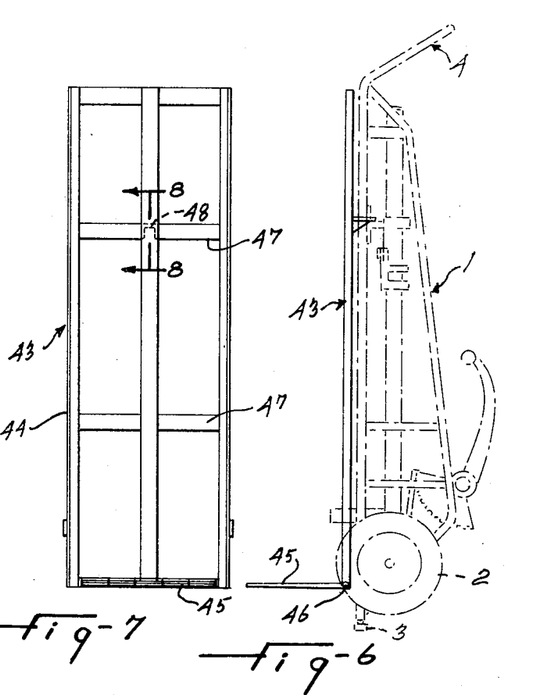
FIG. 6 is a side elevation of an accessory which can be hooked to the hand truck and used for transporting other types of loads than flanged or beaded containers or drums.
FIG. 7 is a front elevation of the accessory of FIG. 6.

FIGS. 6 and 7 show an accessory which can be hooked onto the hooking finger 36 of the top fixed jaw 6 and which serves to transport packages and other types of loads not provided with a top flange or bead, capable of being grasped by the clamp 5. The accessory shown at 43 includes a rectangular frame 44 provided at its lower end with a load transporting shelf 45 pivoted to the frame 44 about a transverse axis 46.

The frame 44 has one of its cross braces 47 formed with a rearwardly extending flange 48 having a central hole 49 for removably engaging the hooking finger 36 of the top jaw 6.

The load carrying shelf 45 can be pivoted flat against the frame 44 when not in use. When accessory 43 is fitted to the hand truck of the invention, shelf 45 supports a load from underneath and the jacking mechanism 8 can be used to raise the load along the hand truck, so that the load can be deposited at the required elevation.

It will be noted that, when loading the drum B, tilting of the same is facilitated because it is effected by the hand truck, using the feet 3 as a fulcrum and the handle 12 to pivot the hand truck and thus the load about the feet 3. The distance between the top of the drum and the handle 12 is the additional leverage available to tilt the drum, as compared to pushing the drum directly against the top of the same.

It should also be noted that with the drum properly raised along the support 1 and with both wheels 2 and feet 3 resting on the supporting surface S, the center of gravity of the drum can be made to pass between the feet and wheels, resulting in a stable arrangement which can be left unattended, which provides for additional safety in the handling of heavy drums.

FIGS. 9 to 16 show another and preferred embodiment of the hand truck of the invention. This embodiment also includes a support 1', a pair of wheels 2', a pair of feet 3', a handle 4', a clamp mechanism 5' carried by the support and a jacking mechanism 8' for raising the clamp and the drum suspended therefrom.

Figure 13:
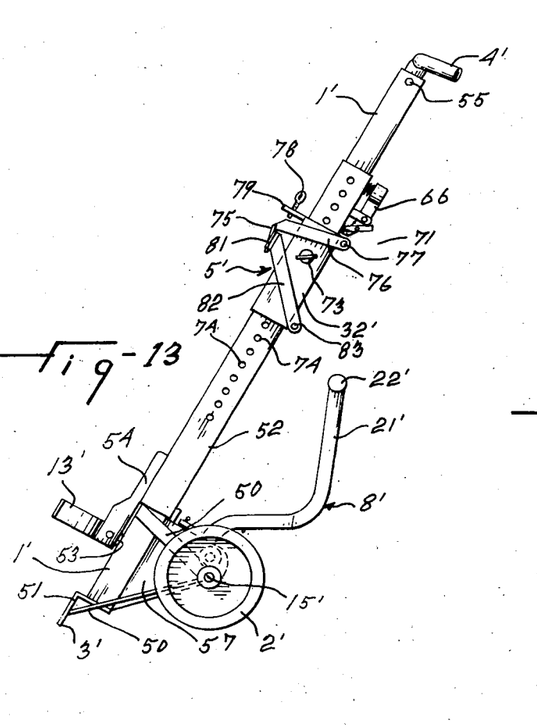
FIG. 13 is a side elevation of the hand truck.
Figure 14:
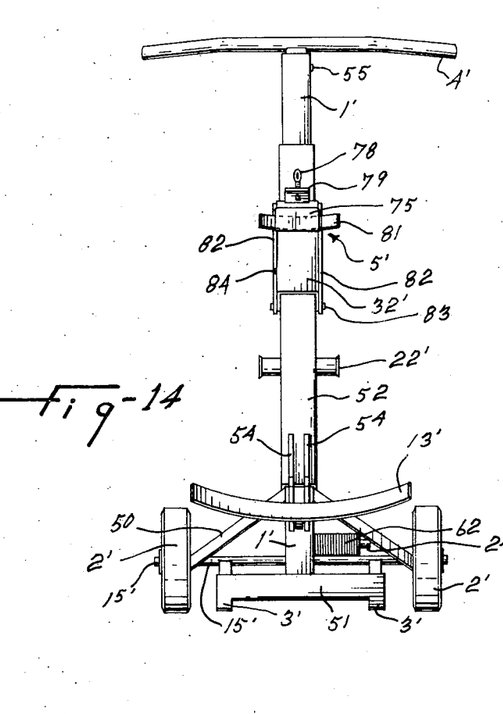
FIG. 14 is a front elevation of the same.

The support 1' consists of a straight tubular member, of square cross-section. The two wheels 2 are rotatably mounted at the ends of a transverse shaft 15' which is rigidly secured to the lower end portion of the support 1' by means of braces 50 and 50'. The shaft 15' is located rearwardly of the support 1' and upwardly from its lower end. The feet 3' are formed by downward projections of an angle iron 51 secured transversely at the lower end of the support 1' and to which the braces 50' are secured.

A tubular sleeve 52, of square cross-section, fits over the support 1' and is longitudinally displaceable thereon. Said sleeve 52 corresponds to the tubular member 16 of the first embodiment. To reduce friction in the movement of sleeve 52 along support 1', a roller 53 is in rolling engagement with the top surface of the support 1'. Said roller 53 is carried by the lower end of legs 54 secured to and protruding downwardly from the lower end of the sleeve 52 at the front thereof. Legs 54 also carry a transversely extending curved saddle 13' having its concave face facing forwardly and of a diameter to conform to the diameter of a standard drum B.

The handle 4' consists of a T-shaped member, the main leg of which is telescopically engaged in the upper end of the tubular support 1' and is adjustably secured therein by means of a bolt 55 engageable in any of a plurality of holes of the main leg of the T-shaped handle. Thus, the level of the handle can be adjusted to suit the user.

Figure 16:
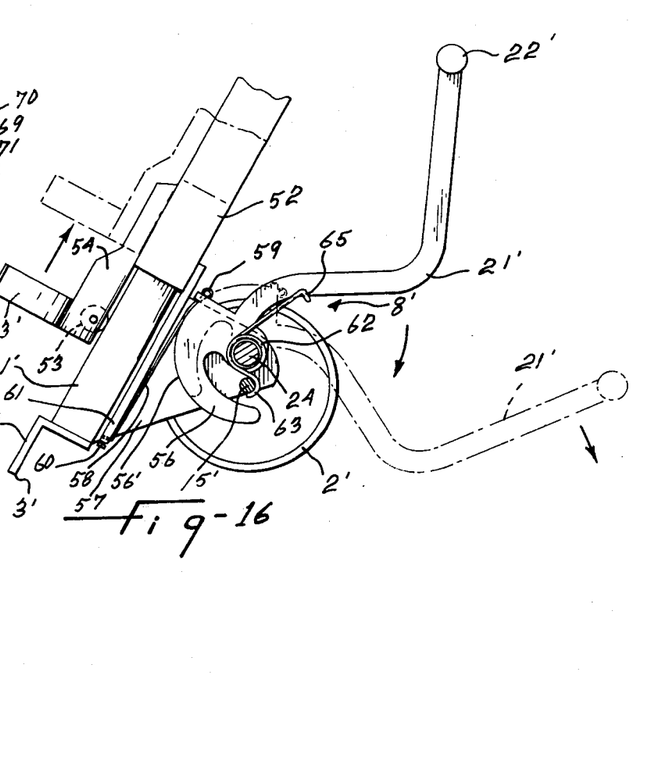
FIG. 16 is a partial side elevation of the bottom portion of the hand truck showing the jacking mechanism.

The sleeve 52 is raised along the support 1' by means of the jacking mechanism 8' which comprises a cam plate 56 integral with a lever 21' carrying at its outer end a pedal 22'. The cam plate is rotatably mounted on a transverse stud shaft 24' carried by a pair of ears 57 rigidly secured to the lower end portion of the support 1' and of triangular shape. These ears 57 extend rearwardly from the support 1' on each side of cam plate 56 and such that the stud shaft 24' is located rearwardly of the support and upwardly from the feet 3'.

A flexible steel strip 58 is attached at its upper end to the top edge of the cam edge 56' of the cam plate 56. The steel strip extends through a slot formed at the cam edge and is curved into a loop to receive a cross pin 59 which abuts against the top of the cam edge to prevent disengagement of the strip from the slot, while allowing slidable movement of the strip within the slot. The lower end of the steel strip 58 is attached by bolt 60 to the lower end of a rod 61 rigidly secured to the back of the lower end portion of the sleeve 52 and extending downwardly therefrom (see FIG. 16).

A coil spring 62 surrounds the stud shaft 24' and has a bent end 63 engaging cross shaft 15' secured to one of the ears 57, while the other end of the coil spring is bent to engage the underside of lever 21', as shown at 65. The spring 62 is stressed to normally maintain the lever 21' in a raised limit position, as shown in full line in FIG. 16.

It will be understood that the downward push on pedal 22' will rotate the cam edge 56' in clockwise movement, as shown in FIG. 16, whereby the steel strip 58 will drape itself around the cam edge and cause raising of the sleeve 52 along the support 1'.

Figure 15:
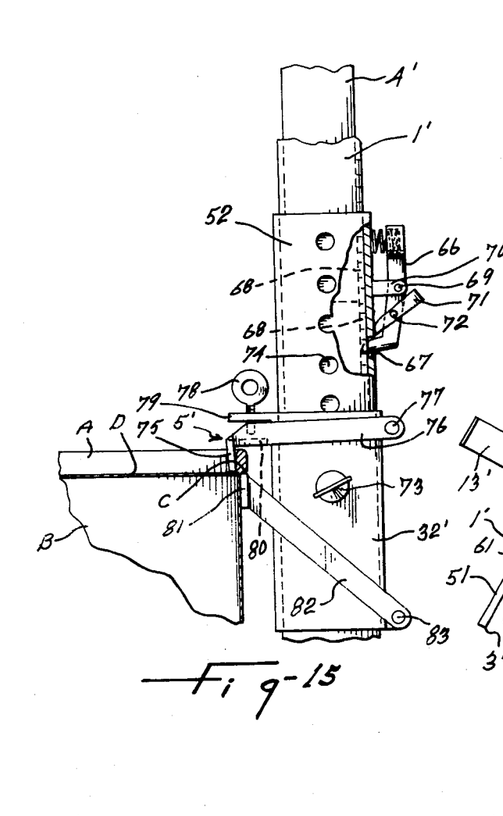
FIG. 15 is a detailed view of part of the support provided with the clamping mechanism.

As shown in FIG. 15, a spring-loaded pawl 66 is carried by the sleeve 52 and is engageable through a hole 67, formed at the back of the sleeve 52, and through anyone of a plurality of holes 68 made in the back face of the support 1', so as to adjustably retain the sleeve at any required level along the support 1'. Raising of the sleeve 52 by the jacking mechanism 8' will cause automatic engagement of the pawl 66 in the desired hole 68, so that the sleeve is retained at the required level upon release of the pedal 22'. The pawl 66 is pivoted intermediate its ends at 69 to ears 70 secured to the sleeve 52. A releasing lever 71 is pivoted at 72 to the pawl 66 and, when manually rotated clockwise from the position of FIG. 15, will engage the back face of the sleeve 52 and remove the end of the pawl from engagement with the holes 68, so as to permit free movement of the sleeve along the support 1'.

The clamp 5' comprises a collar 32' surrounding the sleeve 52 and longitudinally slidable thereon, being retained in adjusted position on sleeve 52 by means of a spring-loaded pin 73 (see FIG. 15), which is caused to removably engage a selected one of a series of spaced holes 74 made in the side face of the sleeve 52.

The collar 32' carries a top jaw 75 which is pivotally connected to the collar. The top jaw 75 consists of a curved strip secured at the upper end of a pair of levers 76, which are pivoted at 77 at the upper end of the back of the collar 32'. The jaw 75 is free to pivot downwardly but its topmost limit position can be adjusted by means of a bolt 78 screwed through a shelf 79 secured to and projecting forwardly from the top edge of the collar 32'. The bolt 78 is adapted to abut a cross plate 80 extending between the forward ends of the levers 76 and secured thereto.

A lower jaw 81 consists of a curved transversely extending strip attached at its ends to a pair of side levers 82 downwardly and rearwardly extending from the jaw 81 and pivoted at 83 to the lower back corner of the collar 32'.

A side pin 34, shown in FIG. 14, protrudes from one side of the collar 32' and serves as a stop for one of the levers 82 to limit the downward movement of the jaw 81. The top jaw 75 overlaps the lower jaw 81. The top jaw is adapted to engage the inside surface of the bead A of the drum B, as shown in FIG. 15, while the lower jaw 81 is adapted to engage the outside surface of the drum just below downwardly facing external step C of the bead A.

The bolt 78 serves to limit the upward movement of the jaw 75, so that the bottom edge of said jaw will positively engage the cover D of the drum when the lower jaw 81 positively engages the step C of the drum.

Figures 9, 10, 11, 12:
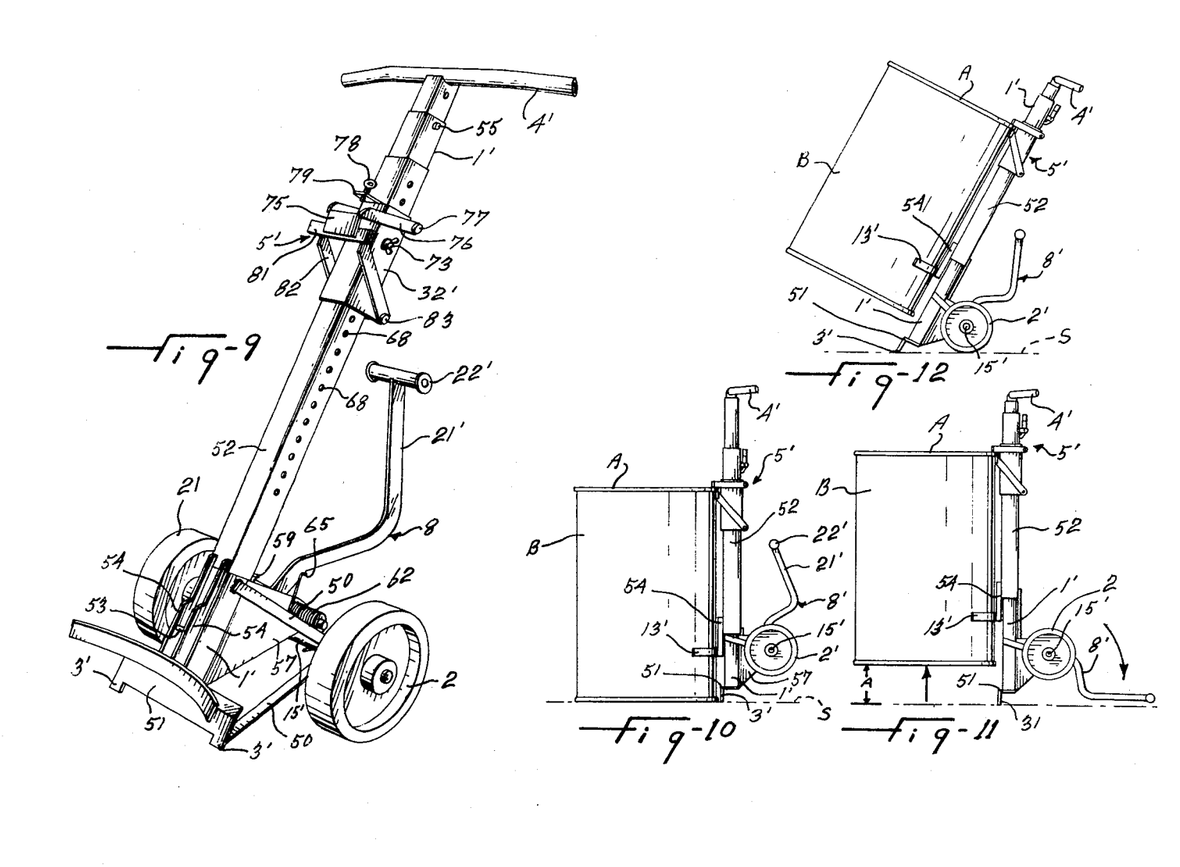
FIG. 9 is a perspective view of a second embodiment of the truck of the invention.
FIG. 10 is a side elevation of the hand truck in upright position and clamping a drum.
FIG. 11 is a side elevation which shows how the drum is raised by the jacking mechanism of the hand truck.
FIG. 12 shows the loaded hand truck left unattended in stable position.

The hand truck in accordance with the second embodiment is used in the same manner as the hand truck of the first embodiment. As shown in FIGS. 10 to 12, the hand truck is brought in upright position alongside the upstanding drum B and centered with respect to the same. The top jaw is manually raised so as to clear the bead A. This can also be achieved by slightly depressing pedal 22. Then the support 1' is pushed against the drum, so that the top jaw, upon lowering, will engage the inside of the bead A and the lower jaw 81 will engage the drum outside surface. Upon full downward movement of pedal 22', jaw 81 immediately engages bead step C and the drum is raised, as shown in FIG. 11. It is suspended from clamp 5' and centered by saddle 13'. Handle 4' is then pulled rearwardly using feet 3' as a fulcrum to tilt the drum, and then to raise feet 3' off the ground for transport.

As shown in FIG. 12, the assembly of the drum and hand truck is stable on a supporting surface S.

To unload the drum, the pedal 22' is slightly declutched so as to raise the sleeve 52 slightly to enable releasing of the pawl 66, which then can be unlatched by hand. Then the drum can be lowered while pressing on pedal 22' onto the supporting surface S, or over a platform, pallet or other raised surface with respect to the surface supporting the wheels 2'. This is preferably effected while the drum is still rearwardly tilted, so that, upon subsequent raising of the clamp, the lower jaw will automatically clear the bead A of the drum.

It is obvious that a simplified hand truck can be made in accordance within the principle of the invention in which the jacking mechanism will be eliminated and the clamp 5' directly mounted on the support 1' in adjusted position thereon. Clamping and unclamping of the top bead or flange of the drum, or similar container, will be effected in the same manner as previously described but without slight lowering or raising of the clamp, manipulation of the two jaws for clamping or unclamping being effected by hand.

In this embodiment, the adjustable handle system can be used to increase the leverage action of the hand truck for effecting tilting or untilting of the drum onto or off of the support 1'.

Mechanism can be provided to remote control the release of pawl 66 from handle 4' to enable keeping both hands on the handle.

What I claim is:

1. A hand truck including an elongated support, a pair of wheels carried by the lower end portion of said support, a pair of feet secured to the lower end of said support forwardly and downwardly from said wheels and adapted to maintain said wheels off a supporting surface when said feet rest on said surface, said feet clearing said surface when said support is rearwardly tilted in inclined position with said wheels in rolling engagement with said surface, a handle carried by the upper end of said support, a bracket mounted on said support intermediate its ends and a clamp mounted on said bracket at the front of said support and clampable about the top bead or top flange of a load, said clamp carried by said bracket at a level to be engageable with the top bead, or flange, of a load upstanding on a supporting surface and the support upright on its feet adjacent the container, whereby once the load is clamped by said clamp, said support can be tilted backwardly by said handle along with said load suspended from said clamp, so that said support can take said inclined position to move the hand truck and load about by means of said handle, a jack mechanism carried by said support and connected to said bracket, and operable to raise said bracket along said support, whereby a load clamped by said clamp can be raised off the ground and along said support by operation of said jack mechanism a distance sufficient to locate the center of gravity of the load suspended from said clamp, such that its line of force will fall between said feet and said wheels, when both said feet and said wheels contact a supporting surface, said jack mechanism including a foot-operated pedal pivotally carried by the lower end portion of said support and at the back of said support, a cam member fixed to said pedal, an elongated member carried by said support for longitudinal movement therealong, said bracket mounted on said elongated member, and a flexible tension member attached to the lower end of said elongated member at one end, and to said cam member at the other end, whereby downward movement of said pedal causes raising of said elongated member along said support.

2. A hand truck including an elongated support, a pair of wheels carried by the lower end portion of said support, a pair of feet secured to the lower end of said support forwardly and downwardly from said wheels and adapted to maintain said wheels off a supporting surface when said feet rest on said surface, said feet clearing said surface when said support is rearwardly tilted in inclined position with said wheels in rolling engagement with said surface, a handle carried by the upper end of said support, a bracket mounted on said support intermediate its ends and a clamp mounted on said bracket at the front of said support and clampable about the top bead or top flange of a load, said clamp carried by said bracket at a level to be engageable with the top bead, or flange, of a load upstanding on a supporting surface and the support upright on its feet adjacent the container, whereby once the load is clamped by said clamp, said support can be tilted backwardly by said handle along with said load suspended from said clamp, so that said support can take said inclined position to move the hand truck and load about by means of said handle, wherein said load is a container of the type including a cover having a peripheral bead upstanding from the cover and protruding from the side walls of the container to form a downwardly extending step, said clamp including a first jaw, a pair of lever arms secured to said first jaw and rearwardly extending therefrom and pivotally connected to said bracket at the back of said support, said first jaw protruding forwardly from said bracket and downwardly extending to engage the inside of said bead over said cover, said clamp further including a second jaw engageable with the external side surface of said container under and in abutment with said step, a pair of lever arms secured to said second jaw and extending downwardly and rearwardly therefrom and pivoted at their lower ends to said bracket at the back of said support, whereby said second jaw tends to pivot forwardly of said support under gravity when said support is in upright position, a shelf secured to said bracket protruding forwardly therefrom and overlying said first jaw, and a manually-adjustable screw threaded in said shelf and abutting against the top of said first jaw to positively limit the upward movement of said first jaw, so that the latter will positively engage the cover of said container when said second jaw engages the downwardly facing step of the bead of said container, and further including a jack mechanism carried by said support and connected to said bracket to raise said bracket along said support, whereby the container clamped by said jaws can be raised off the ground and along said support by operation of said jack mechanism, said jack mechanism includes a foot-operated pedal pivotally carried by the lower end portion of said support at the back of said support and arranged so that downward movement of said pedal will cause raising of said bracket along said support.

* * * * *